March 27, 1962   A. D. COGGESHALL   3,027,476
ELECTRODYNAMIC MACHINES
Filed May 26, 1959
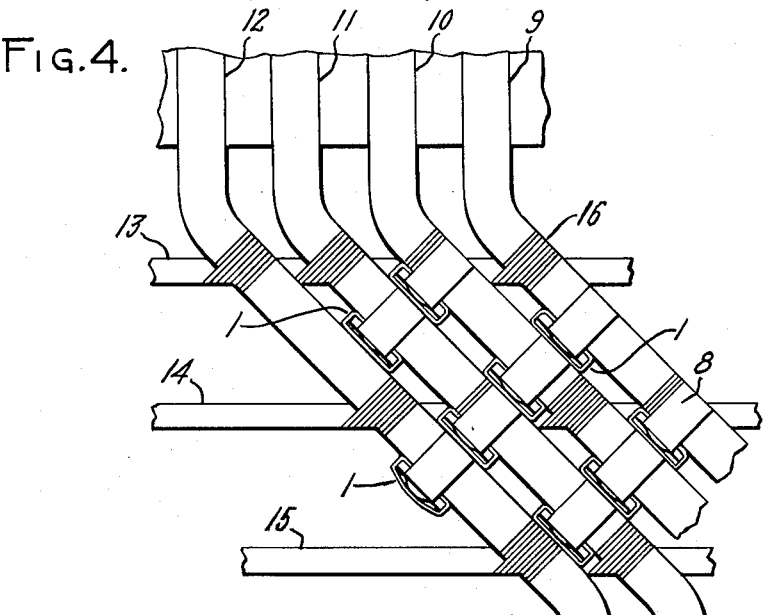
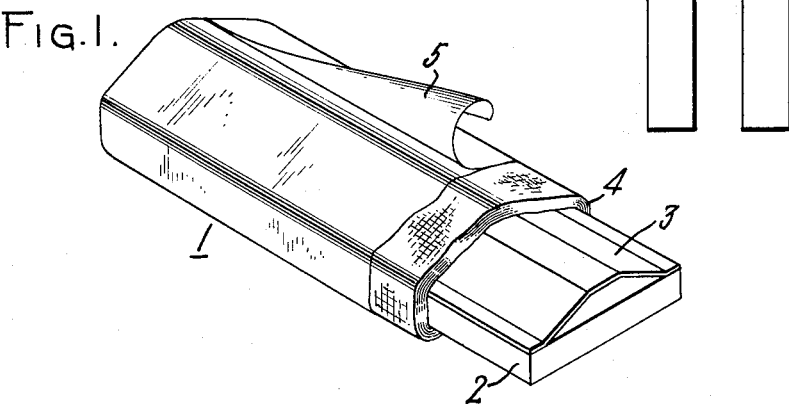
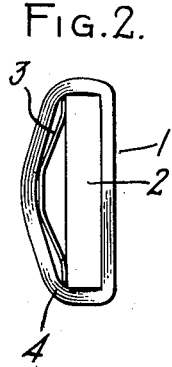
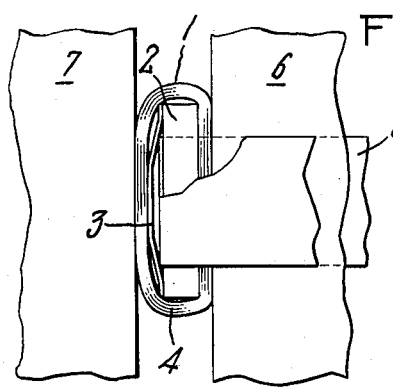
INVENTOR
ALMY D. COGGESHALL
BY
HIS ATTORNEY United States Patent Office
3,027,476
Patented Mar. 27, 1962

3,027,476
ELECTRODYNAMIC MACHINES
Almy D. Coggeshall, Schenectady, N.Y., assignor to General Electric Company, a corporation of New York
Filed May 26, 1959, Ser. No. 815,977
5 Claims. (Cl. 310—260)

This invention relates to electrodynamic machines. More particularly, the invention relates to improved adjustable or conformable means for blocking apart and restricting relative movement between armature bars in the end winding portions of the stators and rotors of electrodynamic machines.

The stator conductor bars in the end winding portions of electrodynamic machines are subjected during operation of the machines to various electrically induced mechanical forces which tend to warp them out of shape and into contact one with the other, such forces being particularly aggravated during accidental short circuiting of the machine. To prevent such forces either from tearing the end winding portions of the conductor bars out of their connections, and to prevent adjacent conductor bars from abrading and thus short-circuiting the machine, it has been customary to space and restrict the movement of such conductor bars by the use of wooden blocks fitted between the bars and tied in place as with a glass fiber cord. The installation of such wooden blocks requires that the conductor bar be inserted in the machine, the spaces to receive the blocks measured, blocks of approximately suitable size selected, and then fitted as by sanding. The bar must then be removed from the slot so that the blocks can be tied in place, the conductor bar then being replaced in the slot of the stator and the winding of the machine carried out to the next conductor bar. It is quite evident that this method is both tedious and economically unproductive. It will also be quite evident that the rigid blocks are incapable of taking up or closing any slack space which may inadvertently develop during the winding assembly procedure, so that despite ordinary care the machine as completed may have a loosely fitted end winding portion which, under the forces experienced in actual operation, would become aggravated and could lead to early failure of the machine as a whole.

A principal object, therefore, of the present invention is to provide improved spacers for blocking apart and limiting relative movement between the end winding portions of conductor bars of electrodynamic machines.

Another object of the present invention is to provide such means or spacers which are adjustable or resilient in nature, so that during the assembly of the stator end windings, any inequalities in spacing of conductors will be automatically taken up or compensated for.

Another object of the present invention is to make possible the installation of all bars in a generator with temporary spacers which may then be replaced by conformable blocks of the type described herein, as opposed to assembling each stator winding separately, and in succession.

Briefly stated, the present invention relates to conformable or adjustable spacer for blocking and restricting relative movement between armature conductor bars in the end winding portion of electrodynamic machines. The invention is carried out by providing a composite spacer having an insert of suitable material on which there is mounted a resilient or spring-like member held in place by suitable means which, when inserted between adjacent conductor bars as above, will compress and yieldingly hold the conductor bars in relative position. Upon assembly of the entire stator, the resin-impregnated means for holding the resilient member and insert together may be cured in place to form a rigid body of high mechanical strength and resistance to disruptive forces. The present invention is also particularly useful in that it inherently compensates for inaccuracies and deviations in shape and size as between various conductor bars and their ground insulation. While the invention is particularly described in connection with stator end windings, it will be realized that it applies also to rotor windings.

Those features of the invention which are believed to be novel are pointed out with particularity in the claims appended hereto. The invention, however, will be better understood and further objects and advantages thereof, as well as its mode of operation, will be further appreciated by a consideration of the following description and the drawing in which FIG. 1 is a perspective view of a typical spacer, FIG. 2 is an end elevational view of a spacer, FIG. 3 shows a spacer in place between two conductor bars and FIG. 4 shows a mode of mounting spacers in an end winding.

Generally speaking, conformable spacers of the invention, as pointed out above, comprise a solid insert or block portion of generally rectangular shape, the length of which is equal to the width of opposing sides of adjacent conductor bars. This insert or block may be of any suitable solid, preferably electrically insulating, material and is typically a resin-impregnated laminated material, the only limitation as to material and resin impregnant being that they shall withstand temperatures experienced in the electrodynamic machine, which are of the order of up to about 150° C. Wooden blocks may be used if desired, but it has been found that resin-impregnated laminated material is to be preferred.

Mounted lengthwise on one side of the block is a generally arcuate spring-like or resilient member with its convex side disposed outwardly from the block. The resilient bowed member is held in placed by a plurality of layers of resin-impregnated tape which is wound around the block and spring, the tape being impregnated with a resin which is uncured, so that there is a certain amount of resiliency or adjustability not only in the spring but in the tape itself. Later, when the entire stator end winding has been assembled with the spacers in place, the resin in the tape is cured to form a unitary, rigid body. The spacers are placed between the adjacent conductor bars with a tap fit so that the resilient member is completely compressed or, in a typical case, compressed to such an extent that not more than about 0.1 inch clearance exists between the block and the spring. The spacer is held in place by inserting a piece of tape between the uncompressed spring and the insert or block before insertion between the conductor bars, such tape then being passed around the conductor and fixed in place.

Referring to the drawing, there is shown in FIG. 1 a schematic drawing of a typical conformable spacer of the present invention, with its outer tape wrapping partially removed. The spacer 1, as pointed out above, has an insert or block 2 of resin-impregnated laminated material or other suitable material as desired which will withstand the temperatures and mechanical forces experienced. Preferably, the block is of a laminated material impregnated with a resin such as a phenolformaldehyde resin, an epoxy resin, polyester resin, and other resins which are well known to those skilled in the art. While the length and width of the inserts 2 are generally of the same dimension for any particular machine, the thickness of the insert may be varied according to the distance between the conductor bars which may differ because of uncontrollable variations in spacing, as well as variations in the thickness of the ground insulation on the conductor bar. The resilient or spring-like member 3 may be made of any material which will even under total compression retain its resiliency and exert a restoring force while held in a compressed condition. While the spring may be of a suitable metal, it is preferable, of course, inasmuch as it is associated with electrical insulating material, that it be made of insulating material itself. Thus, it has been found convenient to mold the resilient or spring member out of a plurality of layers of glass cloth which are coated and impregnated with a suitable resin and molded into shape as shown. Typically and usefully, three layers of five-mil thick glass cloth impregnated with any resin such as an epoxy resin, polyester resin, etc. have been found useful in making the spring member. Wrapped around the spring member and the insert or block, and holding the two in place, are a plurality of layers of resin-impregnated fabric which is typically a glass fabric, although, of course, it may be of other heat-resisting resinous or other fabrics, the fabric being uncured, so that the impregnated glass cloth layer 4 itself exhibits a certain amount of conformability in and of itself. In order to facilitate the insertion of the conformable spacer between adjacent conductor bars, it is preferable to wrap around the spacer structure one or more layers of a suitably slippery thin film material 5, which may be of any of a number of well known resins. In some cases this can be dispensed with. Typical of such materials are polycarbonate resins, the nylons, polytetrafluoroethylene or fluorocarbons, high temperature resistant polyethylene, and polyethylene terephthalate among others.

Shown in FIG. 2 is an end elevational view of the spacer block shown in FIG. 1 without the overlying lubricating wrapper 5. As a practical matter, the conformable spacers can be made in lengths of several feet or more, and then cut into suitable lengths for any particular size conductor bar. It will be realized, of course, that while the resilient or spring member 3 as shown is of a particular configuration or shape, springs of other shapes have been used successfully. Thus, instead of having one convex shaped member as shown in 3, the spring itself may be of a corrugated nature, thus presenting more than one convex face within the width of the insert block. Likewise, a truly arcuate spring can be used, and in certain cases not one but two resilient members may be used, one mounted on each of the two opposite faces of the insert block 2. Not only may resilient members of different shapes be used, but partial saw-cuts of suitable depths may be made at desired places along the length of the resilient member, or if desired, along the length of the completed spacer block itself, which will enable the block and resilient member contained therein to conform more readily to inequalities or disconformities in the conductor bars which are being blocked and spaced. Thus, in such a system, where irregular surfaces are encountered, certain parts of the articulated resilient member or conformable block will be in a completely compressed condition, while other parts may be in a comparatively more open condition.

Shown in FIG. 3 is a view of the conformable spacer in place between two conductor bars which are to be blocked or spaced. It will be seen that the resilient member 3 is nearly compressed to its limit, there having been inserted through the space between the resilient spring and the insert before mounting between the conductor bars one or more layers of a fabric tape, such as of glass 8, which is passed around the conductor bar 6 on which the block is mounted and secured in place, as by cementing or other convenient means.

Shown in FIG. 4 is a partial view of the end winding portion of an electrodynamic machine stator with conductor bars 9, 10, 11 and 12, bound in place as at 16 to binding bands 13, 14 and 15 by a suitable fabric tape. Shown also are a plurality of conformable spacers or blocks 1, tied or fixed in place to the conductor bars by tape 8. While such conformable spacers are preferably mounted in column form or in line on the conductor bars as shown to promote columnar rigidity and best reduce any tendency toward shifting of the conductor bars relative to one another, it will be realized that where circumstances indicate, they may be mounted on adjacent conductor bars in staggered fashion. Shown mounted on conductor 12 is conformable block 1, which has not as yet had its resilient members compressed. When all of the conductor bar conformable spacers 1 have been mounted in place in the completely assembled stator winding, the entire structure is subjected to a temperature for such time as will completely cure the particular resin used in the wrapper 4 of the conformable spacer. As pointed out above, this resin can be any of a number of materials including, but not limited to, polyester resins, epoxy resins, polycarbonate resins, low-pressure phenolic resins, and laminating resins in general. Preferably, the resins should have a relatively high viscosity or gel-like consistency at the working temperature.

It will be apparent that there is provided by the present invention improved means for blocking and spacing the conductor bars in the end portion of stator windings of electrodynamic machines. By means of the conformable spacers described herein, such spacers may be tap-fitted between adjacent conductor bars in lieu of temporary blocks placed therein during the preliminary assembly of the stator windings, and as the blocking of the conductor bars proceeds around the stator, any non-conformities in blocking are taken up not only by varying the thickness of the insert in the conformable spacer, but by the resilient member inserted therein, so that when the stator winding is completed, it is completely blocked in place with no looseness whatsoever. Furthermore, when the resin-impregnated tape which holds the insert and resilient member together, and which of itself is resilient to a certain degree, is cured, the entire end portion of the stator winding is fixed rigidly in a unitary mass, which resists electrically and other induced forces which tend to tear it apart.

What I claim as new and desire to secure by Letters Patent of the United States is:

1. Means for restricting the relative movement of conductor bars in the end winding portion of electrodynamic machines, said means comprising blocks inserted between adjacent ones of said conductor bars, and fixed to one thereof, each of said blocks having mounted thereon a resilient member.

2. In an electrodynamic machine, means for holding the end turn conductor bars in spaced position relative one to the other, said means comprising conformable spacers, each spacer comprising a resin-impregnated insert having mounted on one side thereof a resilient member held in place by at least one layer of resin impregnated tape, and means for holding said spacer in place on a conductor bar.

3. In a blocking system for preventing relative movement between adjacent conductor bars in the end windings of electrodynamic machines, at least one conformable spacer mounted on one of said bars, each spacer comprising a cured resin-containing insert having mounted on one side thereof an elastic resin impregnated and cured spring held inplace by at least one layer of tape impregnated with an uncured resin, said spring being spaced in bowed fashion from said block, whereby said block may be inserted in yielding fashion between adjacent conductors and the wrapping cured in place to form a rigid structure.

4. Means for restricting the relative movement of adjacent armature bars in the end winding portions of electrodynamic machines, said means comprising spring-loaded inserts which are capable of being force fitted between adjacent ones of said armature bars in substantially compressed manner, said blocks being fixed to one of said bars.

5. Means for restricting the relative movement of adjacent armature conductor bars in the end winding portions of electrodynamic machines, said means comprising spring loaded inserts wrapped with tape impregnated and coated with an uncured thermosetting resin and having an overwrapping of a relatively slippery material to facilitate insertion of the blocks between adjacent conductor bars.

References Cited in the file of this patent

UNITED STATES PATENTS

| | | |
|---|---|---|
| 2,437,990 | Askey | Mar. 16, 1948 |
| 2,602,829 | Fromm et al. | July 8, 1952 |
| 2,774,899 | Zeissler | Dec. 18, 1956 |
| 2,844,746 | Coggeshall | July 22, 1958 |

FOREIGN PATENTS

| | | |
|---|---|---|
| 1,032,381 | Germany | Mar. 28, 1957 |